Figure 1:
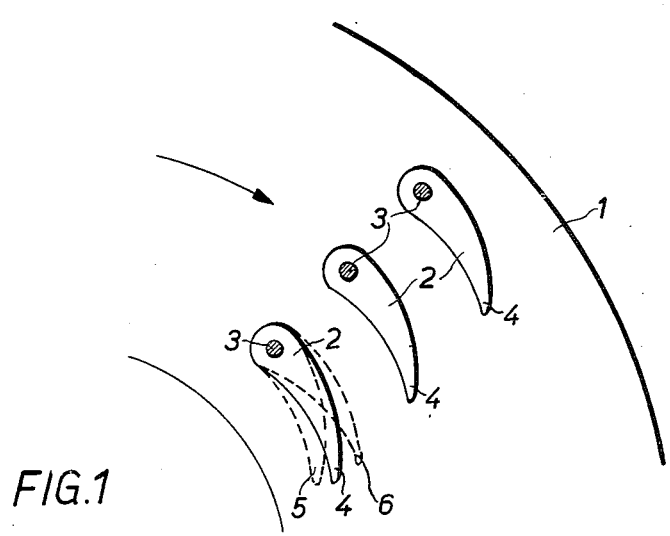

Sept. 10, 1957    J. WEHN ET AL    2,805,900
DUST COLLECTING APPARATUS.
Filed March 31, 1954

INVENTOR.
WERNER BUSCH, JULIUS WEHN.
BY
Burgess & Dinklage
ATTORNEYS tates Patent Office 2,805,900
Patented Sept. 10, 1957

2,805,900

DUST COLLECTING APPARATUS

Julius Wehn, Leverkusen, and Werner Busch, Leverkusen-Bayerwerk, Germany

Application March 31, 1954, Serial No. 420,164

Claims priority, application Germany April 2, 1953

4 Claims. (Cl. 302—64)

The present invention relates to dust collecting apparatus, such as separators, driers with air circulation, pipe bends and the like, and particularly to a method of preventing the deposition of dust particles from a dust-laden gas stream during passage of said dust-laden gas stream into dust collecting apparatus.

The dust collectors on the market which are equipped with guide vanes are effective in collecting and removing dust from the gas passing into the apparatus only so long as the air or gas passages do not become clogged and thus prevent the intended functioning of the apparatus. In these dust collectors dust ends to deposit on and adhere to the surfaces of the guide vanes especially when the air or gas stream contains dust which is sticky or of very small particle size. Attempts have been made to prevent dust from adhering to the surface of the guide vanes by polishing or chrome plating the surfaces of these guide vanes. It has been shown, however, that the polish or chrome coating on the surfaces of the guide vanes is decomposed within a short time by the abrasive action of the dust.

An object of the invention is to provide a method of preventing the premature deposition of dust particles from a dust-laden gas stream during passage thereof into dust collecting apparatus, which would obstruct the free passage of the gas and reduce the effectiveness of the apparatus.

A further object of the invention is to provide a method and means for preventing the clogging with dust of the passages through which gas streams carrying dust are introduced into dust collecting apparatus.

Still further objects will become apparent as the following description proceeds.

The objects of our present invention are accomplished by installing in the passages of the above described dust collecting apparatus, through which gas streams carrying dust are introduced into the apparatus, guide vanes made of flexible material, said guide vanes being arranged in such a manner that they vibrate or flutter under the influence of the dust-laden gas stream and thus prevent the dust from separating from the gas stream prematurely or ensure that any smaller deposits of dust are removed instantly. It is not absolutely necessary according to the invention to use guide vanes which are entirely made of flexible material, but it suffices in most cases to make the reeds or the ends of these vanes of flexible material so that the deposition of dust particles is prevented by the vibrating or fluttering action of these reeds or ends under the influence of the dust-laden gas stream. Furthermore, it is possible to attach to the guide vanes flaps or other appropriate means of flexible material, which are moved by the dust-laden gas stream passing along them. Suitable flexible materials for the purpose of the invention are for instance rubber and plastics. The motion of the guide vanes, their ends or flaps attached thereto, taking place under the influence of the gas passing along the vanes made of flexible material, produces additional stresses and strains which cause thin layers of dust particles deposited on these guide vanes to fly or pop off therefrom at the instant as they are being deposited thereon.

Dust collecting apparatus equipped with guide vanes as described in the specification do not require cleaning operations such as are applied with the various types of mechanical dust collectors now in use.

The invention is further illustrated by way of example in the accompanying drawing.

Fig. 1 shows a bent pipe 1 wherein are arranged guide vanes 2 attached by fixing means 3. Reference numerals 4 denote the ends of the guide vanes 2. The gas stream carrying dust passes in the direction of the arrow and causes the guide vanes 2 to vibrate or flutter thus preventing dust particles from adhering to these guide vanes. The floating motion of the guide vanes 2 is indicated by the dotted lines 5 and 6.

Figure 2:
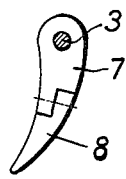
Figure 3:
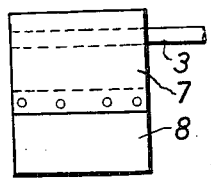

Figs. 2 and 3 show a guide vane 7 the pointed end 8 of which is of flexible material.

We claim:

1. A device for preventing the deposit in a pipe line of solid particles contained in a gas flowing through such a pipe line, which comprises at least one guide vane constructed at least partially of flexible material positioned in said pipe line, whereby solid particles tending to accumulate on said guide vane will be removed therefrom by the vibration of said flexible guide vane as gas passes through said pipe line.

2. A device in accordance with claim 1, which includes a multiple number of said guide vanes positioned in said pipe line.

3. A device in accordance with claim 2, in which said guide vanes are arranged in at least one row positioned substantially perpendicular to the axis of said pipe line.

4. A device in accordance with claim 1, in which said guide vane is constructed entirely of flexible material.

References Cited in the file of this patent

UNITED STATES PATENTS

| 1,827,727 | Blizard | Oct. 20, 1931 |
| 2,261,347 | DiSanto | Nov. 4, 1941 |
| 2,391,484 | Seymour | Dec. 25, 1945 |

FOREIGN PATENTS

| 535,648 | Great Britain | Apr. 16, 1941 |